United States Patent
Liao et al.

(10) Patent No.: US 10,318,731 B2
(45) Date of Patent: Jun. 11, 2019

(54) DETECTION SYSTEM AND DETECTION METHOD

(71) Applicant: INSTITUTE FOR INFORMATION INDUSTRY, Taipei (TW)

(72) Inventors: Jian-Wei Liao, Taipei (TW); Chin-Wei Tien, Taipei (TW); Shun-Chieh Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 262 days.

(21) Appl. No.: 15/369,769

(22) Filed: Dec. 5, 2016

(65) Prior Publication Data

US 2018/0144134 A1 May 24, 2018

(30) Foreign Application Priority Data

Nov. 22, 2016 (TW) ................................ 105138306 A (51) Int. Cl.
  *G06F 21/55* (2013.01)
  *H04L 12/26* (2006.01)
  *G06F 21/56* (2013.01)

(52) U.S. Cl.
  CPC .......... *G06F 21/566* (2013.01); *G06F 21/552* (2013.01); *H04L 43/16* (2013.01); *G06F 21/55* (2013.01); *G06F 2221/033* (2013.01)

(58) Field of Classification Search
  CPC ...... G06F 21/55–21/554; G06F 21/566; G06F 2221/033; H04L 43/16
  See application file for complete search history.

(56) References Cited

U.S. PATENT DOCUMENTS

| | | | | |
|---|---|---|---|---|
| 9,092,625 | B1* | 7/2015 | Kashyap | G06F 21/566 |
| 9,165,136 | B1* | 10/2015 | VanLund | G06F 21/53 |
| 9,355,247 | B1 | 5/2016 | Thioux et al. | |
| 9,747,446 | B1* | 8/2017 | Pidathala | G06F 21/566 |
| 9,860,155 | B1* | 1/2018 | Segel | H04L 43/50 |
| 2007/0150957 | A1* | 6/2007 | Hartrell | G06F 21/552 |
| | | | | 726/24 |
| 2011/0004935 | A1* | 1/2011 | Moffie | G06F 21/53 |
| | | | | 726/23 |

(Continued)

FOREIGN PATENT DOCUMENTS

| CN | 104715201 A | 6/2015 |
|---|---|---|
| TW | I547823 B | 9/2016 |

OTHER PUBLICATIONS

The office action of the corresponding Taiwanese application dated Jul. 13, 2017.

*Primary Examiner* — Daniel B Potratz
(74) *Attorney, Agent, or Firm* — CKC & Partners Co., LLC (57) ABSTRACT

A detection method comprising: (A) transmitting a to-be tested file to a first testing machine by the processing device; wherein the first testing machine uses for executing the to-be tested file; (B) monitoring that whether a component usage of the first testing machine is higher than a default threshold during a period of executing the to-be tested file by the processing device; and (C) when the component usage of the first testing machine is higher than the default threshold, the memory forensics module analyzes the memory space of the first testing machine to determine that whether the to-be tested file comprises a malware program and generate an analyzing result.

14 Claims, 5 Drawing Sheets

(56) References Cited

U.S. PATENT DOCUMENTS

| | | | |
|---|---|---|---|
| 2014/0137255 A1* | 5/2014 | Wang | G06F 21/566 726/24 |
| 2014/0380474 A1* | 12/2014 | Paithane | H04L 63/145 726/23 |
| 2017/0185785 A1* | 6/2017 | Vorona | G06F 21/552 |
| 2018/0048702 A1* | 2/2018 | Patil | G06F 21/568 |

* cited by examiner

DETECTION SYSTEM AND DETECTION METHOD

RELATED APPLICATIONS

This application claims priority to Taiwan Application Serial Number 105138306, filed Nov. 22, 2016, which is herein incorporated by reference.

BACKGROUND

Technical Field

The present disclosure relates to a detection system and a detection method. More particularly, the present disclosure relates to a detection system and a detection method related to the behavior of malware program.

Description of Related Art

With the development of technology, internet becomes an important part in human's daily life. However, the internet also brings the multiple damages to the information security. For example, a user may receive the malware program in an unknown situation. And, the malware program may steal the user information or attack the electronic device to damage it.

Therefore, how to efficiently perform the detection of the malware program in the system becomes a problem to-be solved in the art.

SUMMARY

To address the issues, one aspect of the present disclosure is to provide a detection system. The detection system comprises a memory space, a central scheduling module, a performance monitoring module, a memory forensics module and an analyzing module. The central scheduling module transmits a to-be tested file to a first testing machine; wherein the first testing machine uses for executing the to-be tested file. The performance monitoring module monitors that whether a component usage of the first testing machine is higher than a default threshold during a period of executing the to-be tested file. When the component usage of the first testing machine is higher than the default threshold, the memory forensics module analyzes the memory space of the first testing machine. The analyzing module determines that whether the to-be tested file comprises a malware program according to an analyzing result of the memory space.

Another aspect of the present disclosure is to provide a detection method implemented by a processing device, the detection method comprising: (A) transmitting a to-be tested file to a first testing machine by the processing device; wherein the first testing machine uses for executing the to-be tested file; (B) monitoring that whether a component usage of the first testing machine is higher than a default threshold during a period of executing the to-be tested file by the processing device; and (C) when the component usage of the first testing machine is higher than the default threshold, the memory forensics module analyzes the memory space of the first testing machine to determine that whether the to-be tested file comprises a malware program and generate an analyzing result.

Accordingly, the detection system and the detection method can perform the detection to the specific virtual component in multiple meaningful execution stages and avoid the careless omission of the detection during the malware program execution. Besides, the invention can dynamically analyze whether the memory is abnormal without interrupting the operation of the first testing machine. And, the invention does not need to interrupt the first testing machine and then perform memory dump process. Further, the invention monitors that whether the testing machine executed the to-be tested file (e.g. the first testing machine) is abnormal by the monitoring testing machine (e.g. the second testing machine). As such, the invention does not modify the management mechanism of the virtual machine management device. In this manner, the invention also can avoid the anti-detection mechanism performed by the malware program.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1A:
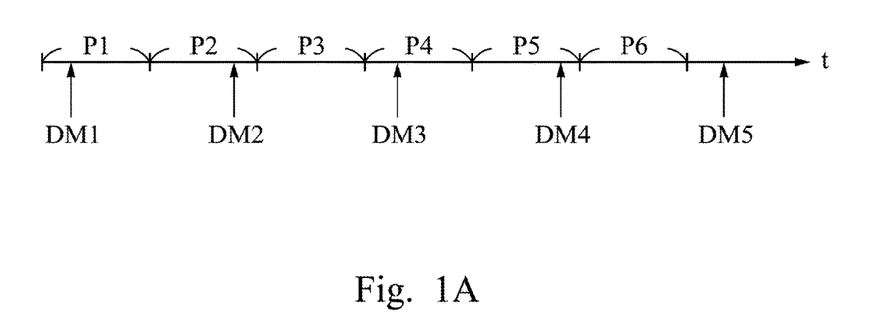
FIGS. 1A-1B depict a schematic diagram of detection method of malware program according to one embodiment of present disclosure.
Figure 1B:
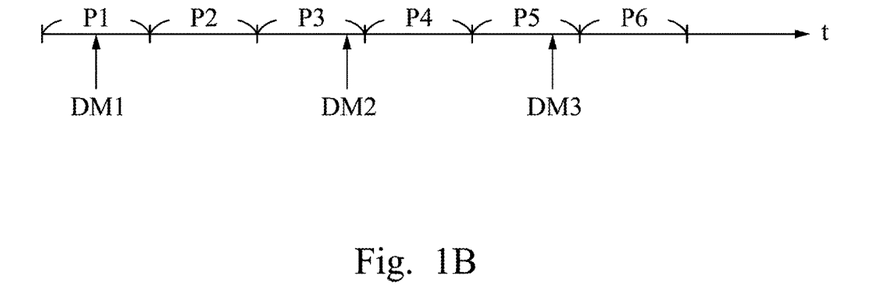

References are made to FIGS. 1A-1B, FIGS. 1A-1B depict a schematic diagram of detection method of malware program according to one embodiment of present disclosure. In FIGS. 1A-1B, the time line t marks multiple execution stages P1-P6. Each one of the execution stages P1-P6 respectively represents a partial execution period of the malware program. For example, the execution stage P1 represents the start execution period. The execution stage P2 represents the vulnerability searching and using period. The execution stage P3 represents the program installation period. The execution stage P4 represents the commanding and controlling period. The execution stage P5 represents the malware behavior execution period. The execution stage P6 represents the destroying evidence period.

In FIG. 1A, the to-be tested computer executes the memory dump processes DM1-DM5 in each fixed time interval, so as to obtain all the executed programs, processes, jobs, opened files, etc. of the current memory of the to-be tested computer. For example, each time interval is 10 seconds. By analyzing these data, it can determine that whether the to-be tested computer is attacked by the malware program. The to-be tested computer can be implemented by the panel, notebook, smart phone or other device with transmission function. However, the memory dump process needs to spend extra time and storage space. Therefore, it will be spent too much time and too much storage space for performing the memory dump process when the time interval is configured too short. In contrast, it may cause that not all the execution stages (e.g. the execution stages P3 and the execution stages P6 in FIG. 1) can be detected to find the attack by the malware program when the time interval is configured too long.

In FIG. 1B, the to-be tested computer executes the memory dump processes DM1-DM3 when a specific application programming interface (API) is detected, so as to obtain all the executed programs, processes, jobs, opened files, etc. of the current memory of the to-be tested computer. Besides, by analyzing these data, it can determine that whether the to-be tested computer is attacked by the malware program. However, the detection method even cannot detect whether the to-be tested computer attacks by the malware program during each one of the execution stages (e.g. the execution stages P2, P4 and P6 do not call the specific API. As such, the execution stages P2, P4 and P6 cannot be detected in FIG. 1B).

Therefore, the following embodiments provide a detection method and a detection system of malware program. The detection method and the detection system can substantially monitoring the to-be tested file in multiple execution stages.

Figure 2:
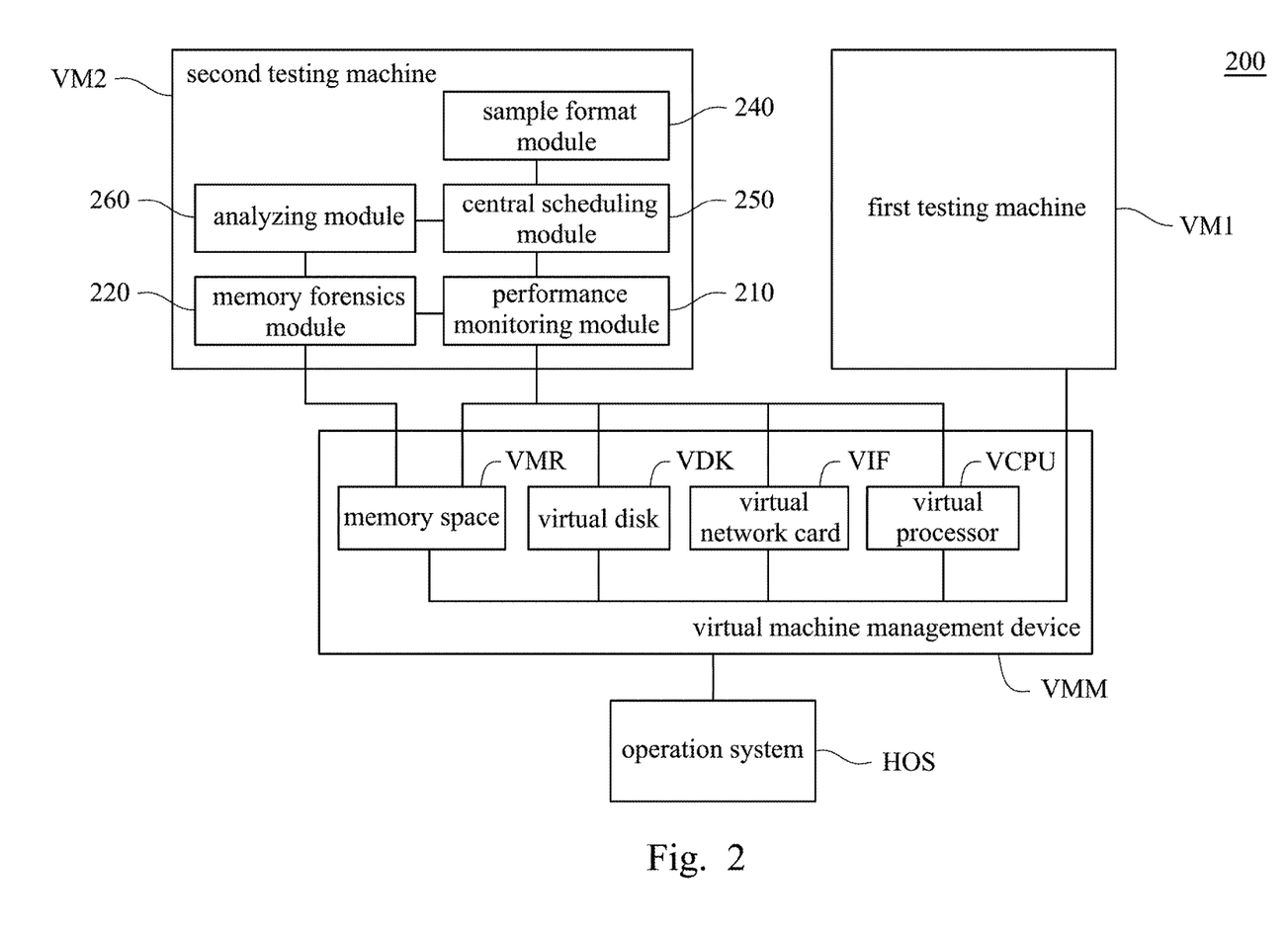
FIG. 2 depicts a block diagram of a detection system according to one embodiment of the present disclosure.

Reference is made to FIG. 2. FIG. 2 depicts a block diagram of a detection system 200 according to one embodiment of the present disclosure. In one embodiment, the detection system 200 includes a second testing machine VM2. The second testing machine VM2 comprises a performance monitoring module 210, a memory forensics module 220, a central scheduling module 250 and an analyzing module 260. In one embodiment, the second testing machine VM2 further comprises a sample format module 240.

In one embodiment, the performance monitoring module 210 is coupled to the memory forensics module 220 and the central scheduling module 250. The memory forensics module 220 is coupled to the analyzing module 260. The analyzing module 260 is coupled to the central scheduling module 250. The central scheduling module 250 is coupled to the sample format module 240.

In one embodiment, the performance monitoring module 210, the memory forensics module 220, the sample format module 240, the central scheduling module 250, and the analyzing module 260 can be separately or combined by using a microcontroller, a microprocessor, a digital signal processor, an application specific integrated circuit (ASIC), or a logic circuit to implement.

In one embodiment, the detection system 200 comprises the first testing machine VM1, the second testing machine VM2 and virtual machine management device (e.g. hypervisor) VMM.

In one embodiment, the first testing machine VM1 and the second testing machine VM2 are constructed (installed or executed) on the virtual machine management device VMM. The virtual machine management device VMM uses for executing an operation system HOS. The first testing machine VM1 and the second testing machine VM2 can respectively access at least one physical device through the operation system HOS. For instance, the first testing machine VM1 and the second testing machine VM2 can respectively access the same physical disk.

In one embodiment, the virtual machine management device VMM uses for virtualizing different kinds of physical devices. The virtual machine management device VMM is formed between the physical device and the software. The virtual machine management device VMM can support multiple operation systems executing on a computer. In other words, the virtual machine management device VMM not only can execute the operation system HOS, but also can execute multiple virtual machines (VM) on the same physical device (e.g. computer). For example, each one of the first testing machine VM1 and the second testing machine VM2 can execute an operation system by itself, respectively. For example, the first testing machine VM1 can execute Windows operation system. The second testing machine VM2 can execute Linux operation system.

In one embodiment, first testing machine VM1 and the second testing machine VM2 operate independently and respectively, just like respectively having the independent physical environment, even when the first testing machine VM1 and the second testing machine VM2 actually executing on the same physical device.

In one embodiment, the invention even can run (or operate) the first testing machine VM1 on a first server and run the second testing machine VM2 on a second server. And, the second server can be used for monitoring the operation of each component in the first server, so as to analyze whether the first server is attacked by the malware program.

In one embodiment, the second testing machine VM2 includes the performance monitoring module 210 and the memory forensics module 220. The performance monitoring module 210 is coupled to the memory forensics module 220. The memory forensics module 220 is communicatively coupled to the memory space VMR of the virtual machine management device VMM. The first testing machine VM1 and the performance monitoring module 210 of the second testing machine VM2 are respectively coupled to the virtual components of the virtual machine management device VMM. The virtual components includes: memory space VMR (e.g. virtual memory), virtual disk VDK, virtual network card VIF and virtual processor VCPU. The first testing machine VM1 and the performance monitoring module 210 of the second testing machine VM2 can respectively access the data of memory space VMR, virtual disk VDK, virtual network card VIF and virtual processor VCPU.

In one embodiment, the memory space VMR can be implemented by using a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

In one embodiment, these virtual components are implemented by software simulation technology. The software can implement the interfaces and the functions similar to the underlying hardware. For example, the software can simulate multiple virtual processors VCPU according to the scheduling algorithm of the physical processor. However, the present invention can apply the existing technologies to create every virtual component. As such, it is not necessary to further describe the details herein.

In some embodiment, the first testing machine VM1 uses for executing the to-be tested file. The second testing machine VM2 uses for monitoring the operation of the first testing machine VM1 to analyze whether the to-be tested file will cause the first testing machine VM1 to be attacked by the malware program. The to-be tested file can be a program, a word file, a figure file, a compressed file or other files that different kinds of the malware programs can be embed in it.

Figure 3:
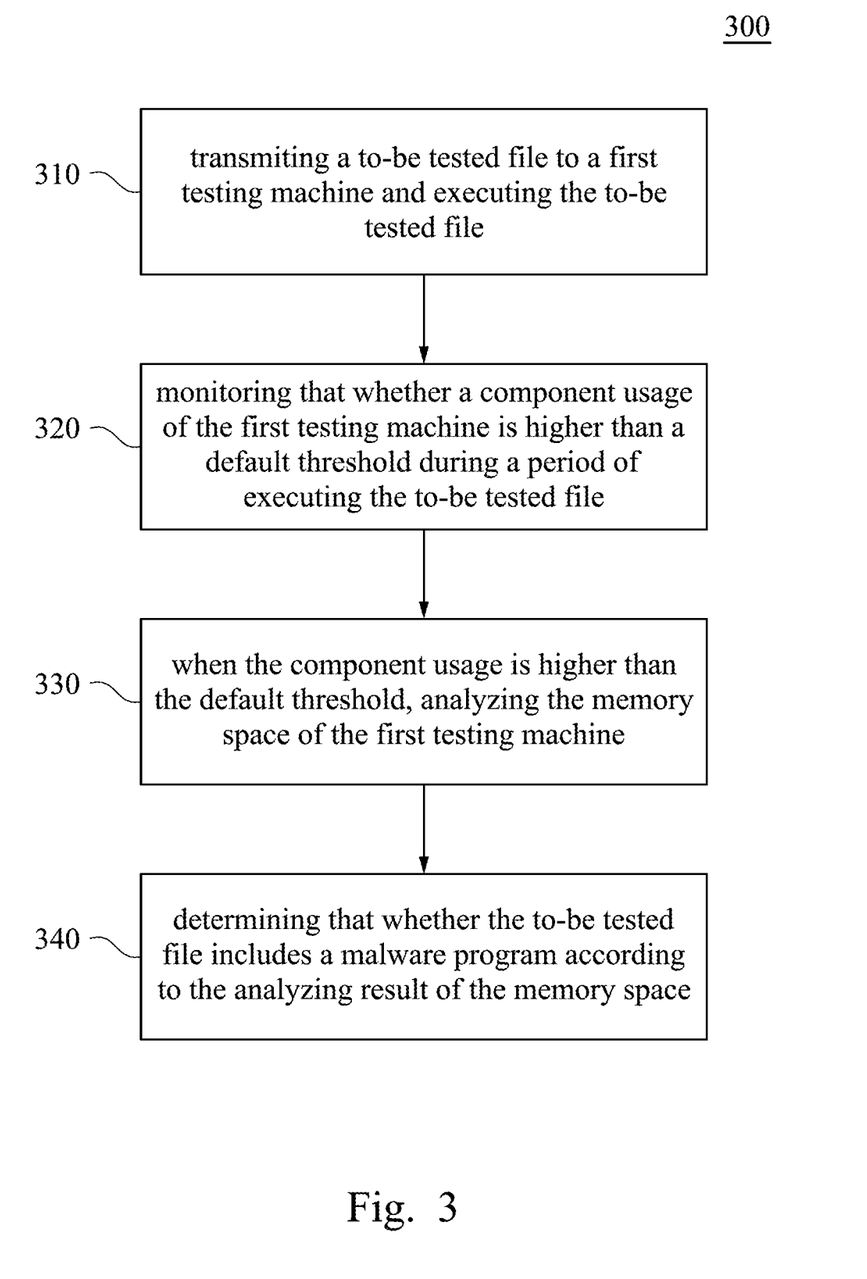
FIG. 3 depicts a flow chart of a detection method according to one embodiment of the present disclosure.

Reference is made to FIG. 3. FIG. 3 depicts a flow chart of a detection method 300 according to one embodiment of the present disclosure. In one embodiment, each step of the detection method 300 can be implemented by a processing device. In one embodiment, the processing device includes the performance monitoring module 210, the memory forensics module 220, the sample format module 240, the central scheduling module 250 and the analyzing module 260.

In step 310, the central scheduling module 250 transmits a to-be tested file to a first testing machine VM1. And, the first testing machine VM1 uses for executing the to-be tested file.

In one embodiment, the first testing machine VM1 includes at least one of a memory, a disk, a network card and a processor.

In one embodiment, the component usage comprises at least one of a memory usage, a disk usage, a network card or network usage, and a processor usage. And, the different component usage corresponds to the different default threshold.

In one embodiment, the first testing machine VM1 can be implemented by a virtual machine. The memory can be implemented by the memory space VMR, the disk can be implemented by a virtual disk VDK, the network card can be implemented by a virtual network card VIF, and the processor can be implemented by a virtual processor VCPU. In one embodiment, the second testing machine VM2 can be another virtual machine.

In one embodiment, the sample format module 240 receives the to-be tested file, determines a file format of the to-be tested file, and selects the first testing machine VM1 corresponding to the file format according to the file format.

In step 320, the performance monitoring module 210 monitors that whether a component usage of the first testing machine VM1 is higher than a default threshold during a period of executing the to-be tested file. If the component usage of the first testing machine VM1 is higher than the default threshold, the memory forensics module 220 analyzes the memory space VMR of the first testing machine VM1.

In one embodiment, the performance monitoring module 210 determines a timing corresponding to an execution stage of the malware program according to the timing when the component usage is higher than the default threshold corresponding to the component usage. The execution stage includes a vulnerability searching and using period, a program installation period, a commanding and controlling period, and a malware behavior execution period.

In one embodiment, the performance monitoring module 210 determines the timing that only the network card or network usage is larger than the default threshold corresponding to each the component usage, to be the at least one of the program installation period and the commanding and controlling period.

In one embodiment, the performance monitoring module 210 determines the timing that a memory usage, a disk usage, a network card or network usage, and a processor usage are all larger than the default threshold corresponding to each the component usage, to be the at least one of the vulnerability searching and using period and the malware behavior execution period.

In step 330, when the component usage is higher than the default threshold, the memory forensics module 220 analyzes the memory space VMR of the first testing machine VM1.

In one embodiment, the memory forensics module 220 analyzes the memory space VMR by at least one of a plurality of processing analyzing operations, a dynamic link library analysis, a file operation analysis, a registry operation analysis, a network behavior analysis, a code injection analysis and a rootkit behavior analysis, to generate an analyzing result.

In step 340, the analyzing module 260 determines that whether the to-be tested file includes a malware program according to the analyzing result of the memory space VMR.

In one embodiment, the detection system 300 monitors the first testing machine VM1 by the second testing machine VM2.

In one embodiment, the first testing machine VM1 and the second testing machine VM2 are constructed on the virtual machine management device VMM. The first testing machine VM1 and the second testing machine VM2 access at least one physical device by an operation system HOS executing on the virtual machine management device VMM.

Figure 4:
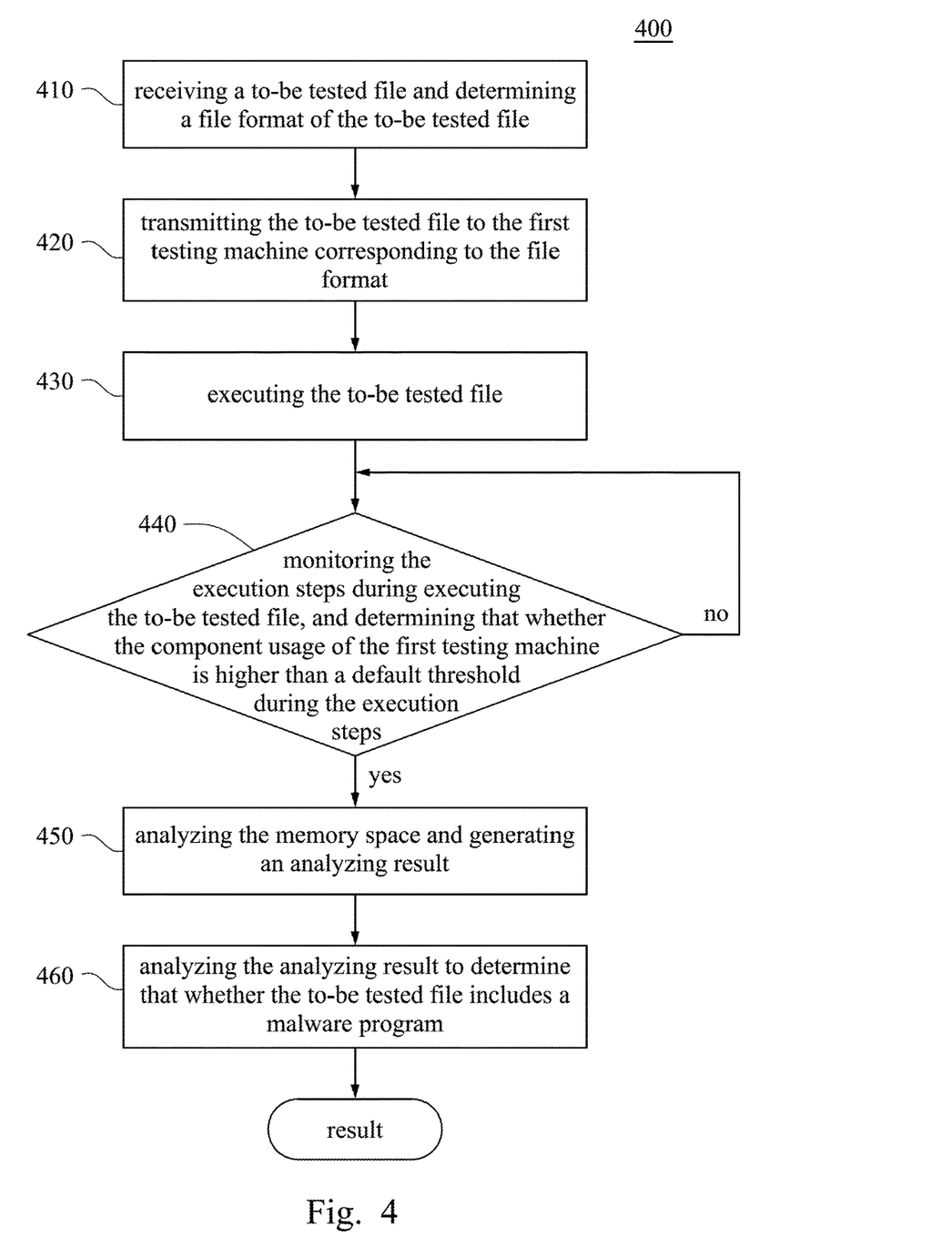
FIG. 4 depicts a flow chart of a detection method according to one embodiment of the present disclosure.

Reference is made to FIG. 4. FIG. 4 depicts a flow chart of a detection method 400 according to one embodiment of the present disclosure.

In step 410, the sample format module 240 receives a to-be tested file and determines a file format of the to-be tested file. The file format indicates the name of the operation system for opening or executing the to-be tested file.

In one embodiment, the second testing machine VM2 can automatically transmits the to-be tested file (e.g. at least one e-mail or a program) to the sample format module 240. The sample format module 240 can determine the to-be tested file should be operated by Windows operation system, Linux operation system or other operation system and then notify the central scheduling module 250 to select the correct testing machine to execute the to-be tested file.

In step 420, the central scheduling module 250 transmits the to-be tested file to the first testing machine VM1 corresponding to the file format.

For example, if Windows operation system is used for executing or opening the to-be tested file and the first testing machine VM1 executes Windows operation system, the central scheduling module 250 transmits the to-be tested file to the first testing machine VM1 corresponding to the file format.

For another example, if Linux operation system is used for executing or opening the to-be tested file and the third testing machine (not shown) executes Linux operation system, the central scheduling module 250 transmits the to-be tested file to the third testing machine corresponding to the file format.

In one embodiment, when the sample format module 240 receives multiple to-be tested files, the central scheduling module 250 uses for scheduling the order of these to-be tested files.

In step 430, the first testing machine VM1 uses for executing the to-be tested file. For example, the first testing machine VM1 can execute the operations, such as executing the to-be tested file, opening an e-mail, decompressing a compressed file or connecting to a link, etc.

In step 440, the performance monitoring module 210 monitors the execution steps (e.g. the execution steps P2-P5 shown in FIG. 1A) during executing the to-be tested file. And, the performance monitoring module 210 determines that whether the component usage of the first testing machine VM1 is higher than a default threshold during the execution steps P2-P5. If the performance monitoring module 210 determines that the component usage of the first testing machine VM1 is higher than a default threshold during the execution steps P2-P5, the performance monitoring module 210 transmits a forensics signal to trigger the memory forensics module 220, and the step 450 is performed. If the performance monitoring module 210 determines that the component usage of the first testing machine VM1 is not higher than a default threshold during the execution steps P2-P5, the step 440 is performed again.

In one embodiment, the execution steps P2-P5 includes the vulnerability searching and using period, the program installation period, the commanding and controlling period, and the malware behavior execution period.

The vulnerability searching and using period, for example, can be a time segment of memory overflow causing by the malware program. It will make the memory usage unusual. The program installation period, for example, can be a time segment of downloading the malware program from the internet and installing the malware program. The commanding and controlling period, for example, can be a time segment of the remote controlling by the malware program. It will make the first testing machine VM1 receive many kinds of malware instructions from internet and cause the network flow abnormal. Besides, the malware behavior execution period indicates the time segment of executing the malware program. For example, the malware program steals the user data during the malware behavior execution period.

On another aspect, the execution step P1 represents a start execution stage. The malicious behavior of to-be tested file may not totally be triggered during the execution step P1. And, the execution step P6 represents the destroying evidence period. The malicious behavior causing by the to-be tested file may be destroyed (e.g. delete the log file) in the execution step P6. Thus, the performance monitoring module 210 does not monitor the execution steps P1 and P6.

In one embodiment, the performance monitoring module 210 monitors that whether the component usage of the first testing machine VM1 is higher than a default threshold value during the execution stages P2-P5. Due to the first testing machine VM1 is implemented on the virtual machine management device VMM, the first testing machine VM1 may use the virtual components of virtual machine management device VMM when executing the to-be tested file. For example, the virtual components of virtual machine management device VMM can be the memory space VMR, the virtual disk VDK, the virtual network card VIF, and the virtual processor VCPU. In one embodiment, the component usage includes a memory space usage, a virtual disk usage, a virtual network card usage and/or a virtual processor usage when the first testing machine VM1 executes the to-be tested file. In other words, the performance monitoring module 210 can respectively regard these virtual component usages as the component usages and monitor these component usages.

Figure 5:
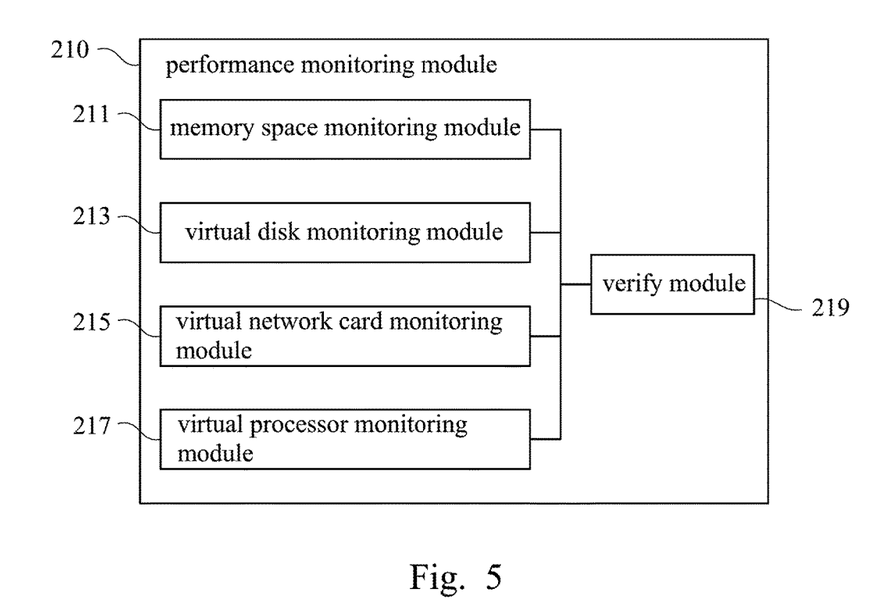
FIG. 5 depicts a block diagram of a performance monitoring module according to one embodiment of the present disclosure.

Reference is made to FIG. 5. FIG. 5 depicts a block diagram of a performance monitoring module 210 according to one embodiment of the present disclosure. The performance monitoring module 210 includes a memory space monitoring module 211, a virtual disk monitoring module 213, a virtual network card monitoring module 215 and a virtual processor monitoring module 217. These monitoring modules are coupled to a verify module 219, respectively.

In one embodiment, the memory space monitoring module 211, the virtual disk monitoring module 213, the virtual network card monitoring module 215, the virtual processor monitoring module 217 and the verify module 219 can be separately or combined by using a processor to implement.

In one embodiment, when the component usage includes the memory space usage, the default threshold includes a memory threshold. The memory space monitoring module 211 obtains the memory space usage from the memory space VMR. The verify module 219 determines that whether the memory space usage is higher than the memory threshold. If the memory space usage is higher than the memory threshold, the performance monitoring module 210 transmits a forensics signal to the memory forensics module 220. If the memory space usage is not higher than the memory threshold, the performance monitoring module 210 substantially monitors the memory space usage.

In one embodiment, when the component usage includes the virtual disk usage, the default threshold includes a disk threshold. The virtual disk monitoring module 213 obtains the virtual disk usage from the virtual disk VDK. The verify module 219 determines that whether the virtual disk usage is higher than the disk threshold. If the virtual disk usage is higher than the disk threshold, the performance monitoring module 210 transmits a forensics signal to the memory forensics module 220. If the virtual disk usage is not higher than the disk threshold, the performance monitoring module 210 substantially monitors the virtual disk usage.

In one embodiment, when the component usage includes the virtual network card usage, the default threshold includes a network flow threshold. The virtual network card monitoring module 215 obtains the virtual network card usage from the virtual network card VIF. The verify module 219 determines that whether the virtual network card usage is higher than the network flow threshold. If the virtual network card usage is higher than the network flow threshold, the performance monitoring module 210 transmits a forensics signal to the memory forensics module 220. If the virtual network card usage is not higher than the network flow threshold, the performance monitoring module 210 substantially monitors the virtual network card usage.

In one embodiment, when the component usage includes the virtual processor usage, the default threshold includes a processor threshold. The virtual processor monitoring module 217 obtains the virtual processor usage from the virtual processor VCPU. The verify module 219 determines that whether the virtual processor usage is higher than the processor threshold. If the virtual processor usage is higher than the processor threshold, the performance monitoring module 210 transmits a forensics signal to the memory forensics module 220. If the virtual processor usage is not higher than the processor threshold, the performance monitoring module 210 substantially monitors the virtual processor usage.

In one embodiment, the performance monitoring module 210 configures the default threshold according to an average value of a history record, a standard deviation of a history record or the rule of thumb. The default threshold can comprise the memory threshold, the disk threshold, the network flow threshold and/or the processor threshold.

Figure 6:
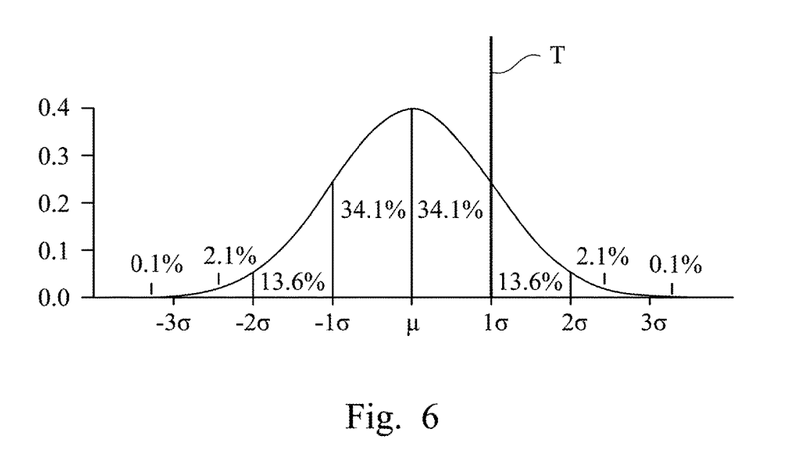
FIG. 6 depicts a schematic diagram of a method for configuring the default threshold according to one embodiment of the present disclosure.

Besides, please refer to FIG. 6 which is related to the configuration of the default threshold. FIG. 6 depicts a schematic diagram of a method for configuring the default threshold according to one embodiment of the present disclosure. For example, the performance monitoring module 210 can accumulate the memory space usage during the last week and then calculate the average value and standard deviation of it. And, the performance monitoring module 210 can configure the memory threshold according to the average value and standard deviation.

In one embodiment, as shown in FIG. 6, the performance monitoring module 210 can configure the memory threshold T by the position which is one standard deviation higher than the average value. When the memory space usage is bigger than the memory threshold T, the performance monitoring module 210 transmits the forensics signal to the memory forensics module 220 for triggering the memory forensics module 220.

In one embodiment, a user can configure the default threshold by the rule of thumb. For example, the user configures the memory threshold T as 70%. Therefore, when the memory space usage is higher than 70%, the performance monitoring module 210 transmits the forensics signal to trigger the memory forensics module 220.

Besides, other default thresholds can be configured by the method above mentioned.

Accordingly, when the first testing VM1 executes the to-be tested file, the second testing VM2 can monitor that whether the first testing VM1 is abnormal. The invention does not need to add a detection program to the first testing machine VM1. Also, the invention even does not modify the management mechanism in the virtual machine management device VMM. Therefore, the invention can avoid the anti-detection mechanism performing by the first testing machine VM1 (e.g. the malware program does not operate the malicious behavior, temporally) when the malware program detects something changed in the first testing VM1 or the virtual machine management device VMM.

In step 450, the memory forensics module 220 analyzes the memory space VMR after receiving the forensics signal to generate an analyzing result.

In one embodiment, the memory forensics module 220 analyzes the memory space VMR by at least one of a plurality of processing analyzing operations, a dynamic link library analysis, a file operation analysis, a registry operation analysis, a network behavior analysis, a code injection analysis and a rootkit behavior analysis.

For instance, some malware programs may change the relations between the processes. Therefore, the memory forensics module 220 also monitors the relations between the processes in memory space VMR. For example, the memory forensics module 220 detects the relations between the hiding process and the performing process.

For instance, some malware programs may change the execution processes or the execution purpose of the normal program by applying code injection to inject the specific codes into the first testing machine VM1. As such, the memory forensics module 220 can check that whether the to-be tested file performs the code injection behavior by monitoring the memory space VMR.

For instance, some malware programs may upload the data stored in the memory into other remote electronic devices by internet. Therefore, the memory forensics module 220 can monitor the memory space VMR to know the network behavior of the to-be tested file, so as to determine whether the data transmission is abnormal.

By the detection method above mentioned, the memory forensics module 220 can generate the analyzing result according to these monitoring result.

In step 460, the analyzing module 260 analyzes the analyzing result to determine that whether the to-be tested file includes a malware program. And then, the analyzing module 260 stores the analyzing result to the database (not shown).

For example, the analyzing module 260 determines that the to-be tested file includes a malware program according to the analyzing result when analyzing result shows that the to-be tested file performs the code injection behavior and causes the first testing machine VM1 operates unusually (e.g. crash down) during the to-be tested file executed by the first testing machine VM1. And, the analyzing module 260 stores the analyzing result to the database.

Accordingly, the detection system and the detection method can perform the detection to the specific virtual component in multiple meaningful execution stages and avoid the careless omission of the detection during the malware program execution. Besides, the invention can dynamically analyze whether the memory is abnormal without interrupting the operation of the first testing machine. And, the invention does not need to interrupt the first testing machine and then perform memory dump process. Further, the invention monitors that whether the testing machine executed the to-be tested file (e.g. the first testing machine) is abnormal by the monitoring testing machine (e.g. the second testing machine). As such, the invention does not modify the management mechanism of the virtual machine management device. In this manner, the invention also can avoid the anti-detection mechanism performed by the malware program.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A detection system, comprising:
   a memory space;
   a central scheduling module, for transmitting a to-be tested file to a first testing machine;
   wherein the first testing machine uses for executing the to-be tested file;
   a performance monitoring module, for monitoring that whether a plurality of component usages of the first testing machine are higher than a plurality of default thresholds respectively corresponding to the component usages during a period of executing the to-be tested file;
   a memory forensics module, when the component usages of the first testing machine are higher than the default thresholds, the memory forensics module for analyzing the memory space of the first testing machine; and
   an analyzing module, for determining that whether the to-be tested file comprises a malware program according to an analyzing result of the memory space;
   wherein the performance monitoring module determines a first timing corresponding to an execution stage of the malware program according to a second timing when one of the component usages is higher than one of the default thresholds corresponding to the one of the component usages;
   wherein the execution stage comprises a vulnerability searching and using period, a program installation period, a commanding and controlling period, and a malware behavior execution period;
   wherein the component usages comprises a memory usage, a disk usage, a network card or a network usage, and a processor usage;
   wherein the performance monitoring module determines a third timing that the memory usage, the disk usage, the network card or network usage, and the processor usage all are higher than their corresponding default thresholds, to be the at least one of the vulnerability searching and using period and the malware behavior execution period; and the performance monitoring module determines a fourth timing that only the network card or network usage is higher than a default threshold corresponding to the network card or network usage, to be the at least one of the program installation period and the commanding and con trolling period.

2. The detection system of claim 1, wherein the first testing machine comprises a memory, a disk, a network card and a processor; and the default thresholds of the memory usage, the disk usage, the network card or network usage, and the processor usage are different.

3. The detection system of claim 2, wherein the first testing machine is a virtual machine, the memory comprises the memory space, the disk is a virtual disk, the network card is a virtual network card, and the processor is a virtual processor.

4. The detection system of claim 1, further comprising:
a sample format module, for receiving the to-be tested file, determining a file format of the to-be tested file, and selecting the first testing machine corresponding to the file format according to the file format.

5. The detection system of claim 1, wherein the memory forensics module analyzes the memory space of the first testing machine by at least one of a plurality of processing analyzing operations, a dynamic link library analysis, a file operation analysis, a registry operation analysis, a network behavior analysis, a code injection analysis and a rootkit behavior analysis, to generate the analyzing result.

6. The detection system of claim 3, further comprising:
a second testing machine, for monitoring the first testing machine.

7. The detection system of claim 6, wherein the first testing machine and the second testing machine are constructed on a virtual machine management device, the first testing machine and the second testing machine access at least one physical device by an operation system executing on the virtual machine management device.

8. A detection method, implemented by a processing device, the detection method comprising:
(A) transmitting a to-be tested file to a first testing machine by the processing device, and executing the to-be tested file by using the first testing machine;
(B) monitoring whether a plurality of component usages of the first testing machine are higher than a plurality of default thresholds respectively corresponding to the component usages during a period of executing the to-be tested file by the processing device; and
(C) when the component usages of the first testing machine are higher than the default thresholds, analyzing a memory space of the first testing machine by using a memory forensics module to determine that whether the to-be tested file comprises a malware program and generate an analyzing result;
wherein step (C) further comprises:

determining a first timing corresponding to an execution stage of the malware program according to a second timing when one of the component usages is higher than one of the default thresholds corresponding to the one of the component usages by the processing device;
wherein the execution stage comprises a vulnerability searching and using period, a program installation period, a commanding and controlling period, and a malware behavior execution period;
wherein the component usages comprises a memory usage, a disk usage, a network card or a network usage, and a processor usage;
determining, by the processing device, a third timing that a memory usage, the disk usage, the network card or network usage, and the processor usage all are higher than their corresponding default thresholds, to be the at least one of the vulnerability searching and using period and the malware behavior execution period; and
determining, by the processing device, the fourth timing that only the network card or network usage is higher than the default threshold corresponding to the network card or network usage, to be the at least one of the program installation period and the commanding and controlling period.

9. The detection method of claim 8, wherein the first testing machine comprises at least one of a memory, a disk, a network card and a processor; and the default thresholds of the memory usage, the disk usage, the network card or network usage, and the processor usage are different.

10. The detection method of claim 9, wherein the first testing machine is a virtual machine, the memory comprises the memory space, the disk is a virtual disk, the network card is a virtual network card, and the processor is a virtual processor.

11. The detection method of claim 8, wherein step (A) further comprises:
receiving the to-be tested file and determining a file format of the to-be tested file, and selecting the first testing machine corresponding to the file format according to the file format by the processing device.

12. The detection method of claim 8, wherein step (C) further comprises:
analyzing the memory space of the first testing machine by at least one of a plurality of processing analyzing operations, a dynamic link library analysis, a file operation analysis, a registry operation analysis, a network behavior analysis, a code injection analysis and a rootkit behavior analysis, to generate the analyzing result by the processing device.

13. The detection method of claim 10, further comprising:
monitoring the first testing machine by a second testing machine.

14. The detection method of claim 13, wherein the first testing machine and the second testing machine are constructed on a virtual machine management device, the first testing machine and the second testing machine access at least one physical device by an operation system executing on the virtual machine management device.

* * * * *